United States Patent
Meek

(10) Patent No.: US 8,001,072 B2
(45) Date of Patent: Aug. 16, 2011

(54) DETERMINING SATISFIABILITY OF A FUNCTION WITH ARBITRARY DOMAIN CONSTRAINTS

(75) Inventor: Colin Meek, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 674 days.

(21) Appl. No.: 12/141,923

(22) Filed: Jun. 19, 2008

(65) Prior Publication Data

US 2009/0319461 A1 Dec. 24, 2009

(51) Int. Cl.
*G06F 17/00* (2006.01)
*G06N 5/02* (2006.01)

(52) U.S. Cl. ........................................................ 706/47
(58) Field of Classification Search ...................... 706/47
See application file for complete search history.

(56) References Cited

U.S. PATENT DOCUMENTS

| | | | |
|---|---|---|---|
| 5,276,897 A | 1/1994 | Stalmarck | |
| 6,714,902 B1 | 3/2004 | Chao et al. | |
| 7,120,569 B2 | 10/2006 | Arroyo-Figueroa | |
| 7,216,306 B1 | 5/2007 | Li | |
| 7,506,290 B2 * | 3/2009 | Jacobi et al. | 716/106 |
| 7,552,407 B2 * | 6/2009 | Baumgartner et al. | 716/106 |
| 7,689,943 B2 * | 3/2010 | Baumgartner et al. | 716/104 |
| 7,739,635 B2 * | 6/2010 | Baumgartner et al. | 716/106 |
| 7,752,593 B2 * | 7/2010 | Baumgartner et al. | 716/104 |
| 7,765,514 B2 * | 7/2010 | Baumgartner et al. | 716/103 |
| 7,788,616 B2 * | 8/2010 | Baumgartner et al. | 716/106 |
| 7,793,242 B2 * | 9/2010 | Baumgartner et al. | 716/106 |
| 7,882,470 B2 * | 2/2011 | Baumgartner et al. | 716/106 |
| 7,908,575 B2 * | 3/2011 | Baumgartner et al. | 716/106 |
| 7,913,205 B2 * | 3/2011 | Baumgartner et al. | 716/105 |
| 7,917,874 B2 * | 3/2011 | Baumgartner et al. | 716/105 |
| 7,921,394 B2 * | 4/2011 | Baumgartner et al. | 716/111 |
| 2007/0162966 A1 | 7/2007 | Agrawal et al. | |

OTHER PUBLICATIONS

Decision Problems of Phrase-Structure Grammars, Landweber, Peter S.; Electronic Computers, IEEE Transactions on vol. EC-13, Issue: 4 Digital Object Identifier: 10.1109/PGEC.1964.263815 Publication Year: 1964, pp. 354-362.*
Routing Strategies to Enhance Traffic Capacity for Scale-Free Networks, Jianwei Wang; Lili Rong; Liang Zhang; Intelligent Computation Technology and Automation (ICICTA), 2008 International Conference on vol. 2 Digital Object Identifier: 10.1109/ICICTA.2008.103 Publication Year: 2008, pp. 451-455.*
Kaser: a qualitatively fuzzy object-oriented inference engine, Rubin, S.H.; Rush, R.J., Jr.; Murthy, J.; Smith, M.H.; Trajkovic, L.; Fuzzy Information Processing Society, 2002. Proceedings. NAFIPS. 2002 Annual Meeting of the North American Digital Object Identifier: 10.1109/NAFIPS.2002.1018085 Publication Year: 2002, pp. 354-359.*
Towards an Interpretable Sparseness for Face Recognition: An Empirical Study, Chao Lan; Xiao-yuan Jing; Qian Liu; Yongfang Yao; Jingyu Yang; Pattern Recognition (CCPR), 2010 Chinese Conference on Digital Object Identifier: 10.1109/CCPR.2010.5659245 Publication Year: 2010, pp. 1-5.*
Bryant Randal E. "Graph-Based Algorithms for Boolean Function Manipulation", Date: Aug. 1986, pp. 1-28, vol. C-35, Issue: 8.

(Continued)

*Primary Examiner* — Michael Holmes

(57) ABSTRACT

A function can be represented as a canonical decision diagram structure. Each vertex of the diagram is associated with a respective function variable. The vertices include at least one vertex that represents a domain of more than two values for the variable associated with the vertex. The decision diagram is used to evaluate the function to determine whether the function is satisfiable or unsatisfiable for given values of the variables.

20 Claims, 5 Drawing Sheets

OTHER PUBLICATIONS

Chelf Ben, "Satisfiability: A New Generation of Static Analysis", Date: 2007, 3 pages.

Fang, et al. "Complete Local Search for Propositional Satisfiability", Proceedings of the Nineteenth National Conference on Artificial Intelligence (AAAI2004), Date: Jul. 25-29, 2004, 6 pages, Copyright: 2004.

Moskewickz, et al. "Chaff: Engineering an Efficient SAT Solver", Proceedings of the 38th conference on Design automation, Date: Jun. 18-22, 2001, pp. 530-535, ACM Press New York, NY, USA.

Silva, et al. "Grasp: A Search Algorithm for Propositional Satisfiability", Date: May 1999, pp. 506-521, vol. 48, Issue: 5.

* cited by examiner

400

410
ACCESS A FUNCTION

420
REPRESENT THE FUNCTION USING BOOLEAN
EXPRESSIONS OF VARIABLES WITH FINITE DOMAINS

430
MAP THE BOOLEAN EXPRESSIONS TO IF-THEN-ELSE
FORMS

440
TRANSFORM THE IF-THEN-ELSE FORMS INTO A
DECISION DIAGRAM

US 8,001,072 B2

DETERMINING SATISFIABILITY OF A FUNCTION WITH ARBITRARY DOMAIN CONSTRAINTS

BACKGROUND

The classic Boolean satisfiability problem can be generally stated as follows: for a given Boolean function of variables, determine whether it is possible to assign values to the variables such that the function is satisfied (that is, the function evaluates to true), or whether no such assignment exists. The Boolean satisfiability problem is of significance in both theoretical research and in practical applications such as artificial intelligence planning, circuit testing, software verification, and database validation.

The satisfiability problem can be solved by representing the Boolean function as a directed acyclic graph (DAG), where each vertex of the DAG represents a variable assignment with the exception of two sink nodes. One sink node represents false function results (e.g., binary zero) and the other sink node represents true function results (e.g., binary one). Each vertex of the DAG likewise has a binary domain. Generally speaking, the function is satisfiable if there is a path through the DAG from a root node to the "one" sink (the true node).

The amount of time and resources needed to determine satisfiability of a function using a DAG such as that just described increases as the number of variables in the function increases. A more efficient approach that saves time and resources would be valuable.

SUMMARY

Instead of constructing a decision diagram where each vertex has only a binary domain, a decision diagram that has at least one vertex representing a domain of more than two values can be constructed.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The accompanying drawings, which are incorporated in and form a part of this specification, illustrate embodiments and, together with the description, serve to explain the principles of the embodiments.

DETAILED DESCRIPTION

Figure 1:
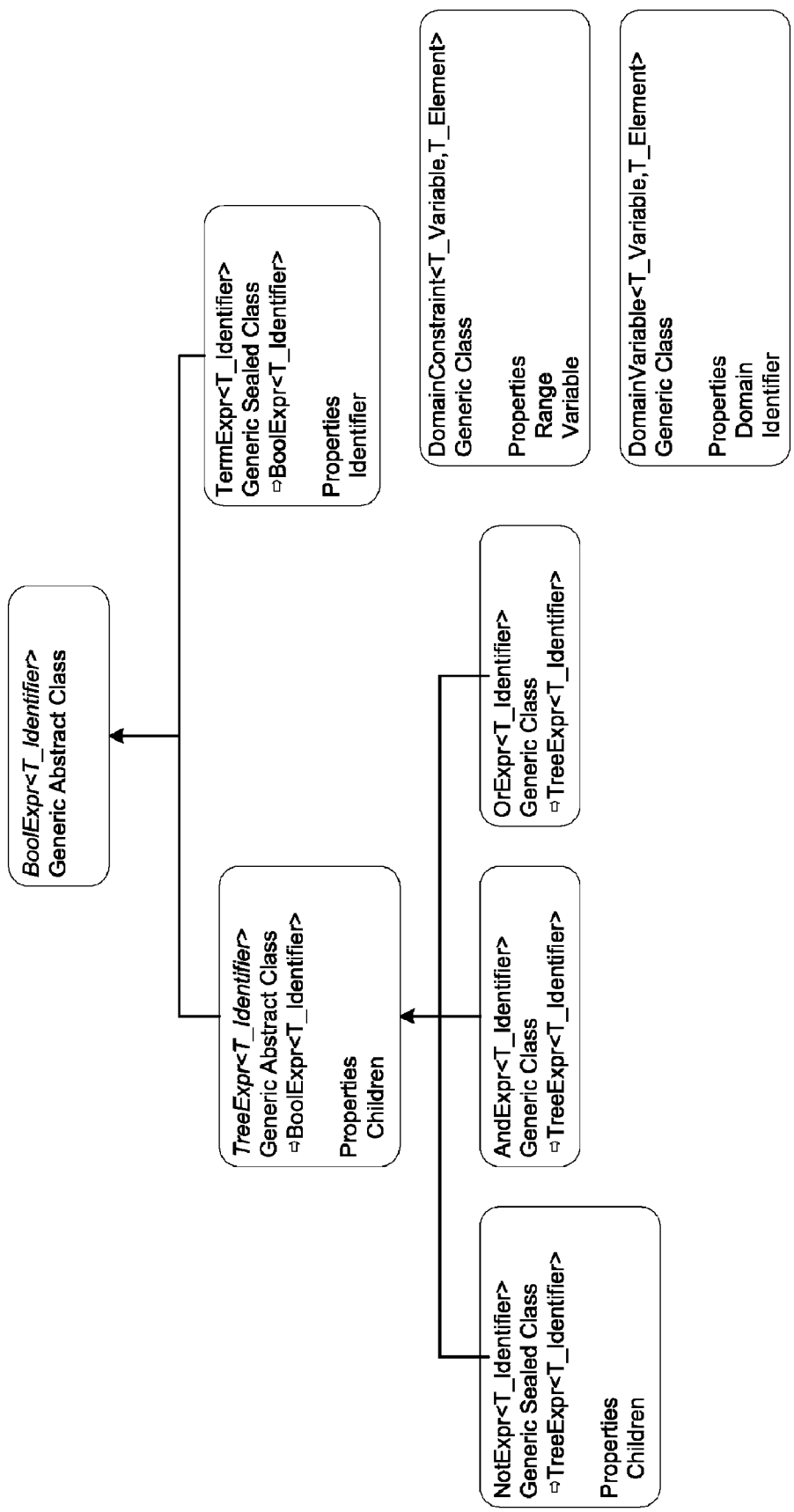
FIG. 1 illustrates a hierarchy of logical functions according to one embodiment.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "representing," "evaluating," "mapping," "transforming," "deriving," "determining" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

According to embodiments described herein, the classic Boolean satisfiability problem can be efficiently solved. In overview, a function can be represented as a canonical decision diagram structure. Each vertex of the diagram is associated with a respective function variable. The vertices include at least one vertex that represents a domain of more than two values for the variable associated with the vertex. The decision diagram demonstrates whether the function is valid, satisfiable or unsatisfiable.

Various terms are used herein as follows:

"domain" $D_i$: a set of possible assignments for a variable $v_i$; as will be seen, if the domain is continuous, it can be mapped to a discrete (finite) domain;

"range" $R_i$: a set of valid assignments for a variable, $R_i < D_i$;

"domain constraint": a function of the form "$v_i$ in $R_i$," indicating that a value is constrained to take a value within a particular range;

"expression": an expression tree representing a logical function, and consisting of And, Or, Not and/or Domain Constraint nodes (vertices);

"literal": a domain constraint or its negation;

"clause": a conjunction or disjunction of literals;

"sentence": a conjunction or disjunction of clauses;

"disjunctive normal form": a logical function represented as a disjunction of conjunctive clauses;

"conjunctive normal form": a logical function represented as a conjunction of disjunctive clauses;

"knowledge base": an aggregation of facts, or true expressions;

"satisfiable function": a logical function that evaluates to true (e.g., a binary one) given some assignment of values to its input variables;

"valid function": a logical function that evaluates to true for every possible assignment to its input variables; and "invalid/unsatisfiable function": a logical function that evaluates to false (e.g., a binary zero) for every possible assignment to its input variables.

In one embodiment, logical functions are represented using the hierarchy shown in FIG. 1. All classes are immutable with the exception of the knowledge base class, which aggregates facts. In the example of FIG. 1, a term "TermExpr" and a term "TreeExpr" are forms of the Boolean expression "BoolExpr." The term "TermExpr" exposes in its "T_Identifier" property either a "DomainConstraint" or a "DomainVariable"—in the latter case, the term is treated as a Boolean variable with domain {true, false}. The terms "NotExpr," "AndExpr" and "OrExpr" are forms of the term "TreeExpr."

Figure 2:
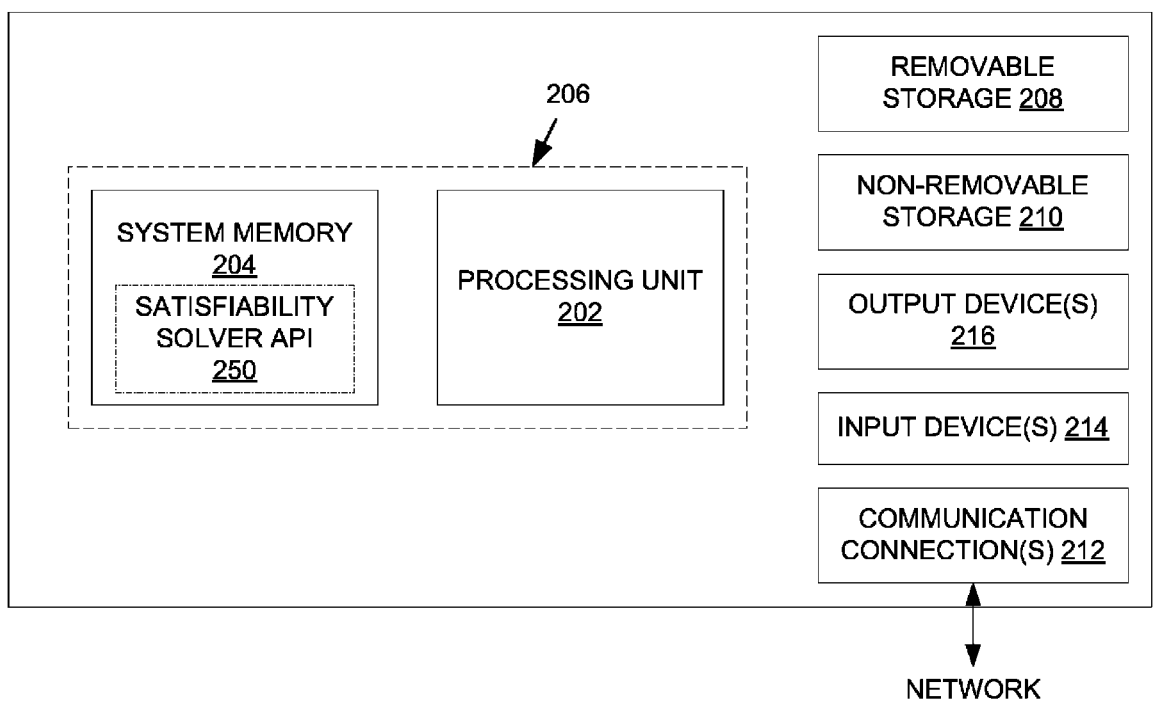
FIG. 2 is a block diagram of an example of a computer system upon which embodiments of a satisfiability solver may be implemented.

FIG. 2 shows a block diagram of an example of a computer system 200 upon which the embodiments described herein may be implemented. In its most basic configuration, the system 200 typically includes at least one processing unit 202 and memory 204. Generally speaking, the system 200 includes at least some form of computer-usable media. Computer-usable media can be any available media that can be accessed by the system 200. Depending on the exact configuration and type of computing device, the memory 204 may be volatile (such as random access memory), non-volatile (such as read-only memory, flash memory, etc.) or some combination of the two. This most basic configuration is illustrated in FIG. 2 by dashed line 206. The system 200 may also have additional features/functionality. For example, the system 200 may also include additional storage (removable and/or non-removable) including, but not limited to, magnetic or optical disks or tape. Such additional storage is illustrated in FIG. 2 by removable storage 208 and non-removable storage 210. The system 200 may also contain communications connection(s) 212 that allow the device to communicate with other devices.

Generally speaking, the system 200 includes at least some form of computer-usable media. Computer-usable media can be any available media that can be accessed by the system 200. By way of example, and not limitation, computer-usable media may comprise computer storage media and communication media.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed by the system 200. Any such computer storage media may be part of the system 200. The memory 204, removable storage 208 and non-removable storage 210 are all examples of computer storage media.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media. The communications connection(s) 212 is an example of communication media.

The system 200 may also have input device(s) 214 such as keyboard, mouse, pen, voice input device, touch input device, etc. Output device(s) 216 such as a display, speakers, printer, etc. may also be included. All these devices are well know in the art and need not be discussed at length here.

The system 200 may operate in a networked environment using logical connections to one or more remote computers, which may be a personal compute (PC), a server, a router, a network PC, a peer device or other common network node, and which may include many or all of the elements described above relative to the system 200. The logical connections may include a local area network (LAN) and a wide area network (WAN), but may also include other networks. Such networking environments are commonplace in offices, enterprise-wide computer networks, intranets and the Internet. When used in a networking environment, the system 200 can be connected to the network through the communication connection(s) 212.

In the example of FIG. 2, the memory 204 includes computer-readable instructions, data structures, program modules and the like associated with a satisfiability solver application programming interface (API) 250. However, the satisfiability solver API 250 may instead reside in any one of the computer storage media used by the system 200, or may be distributed over some combination of the computer storage media.

Figure 3:
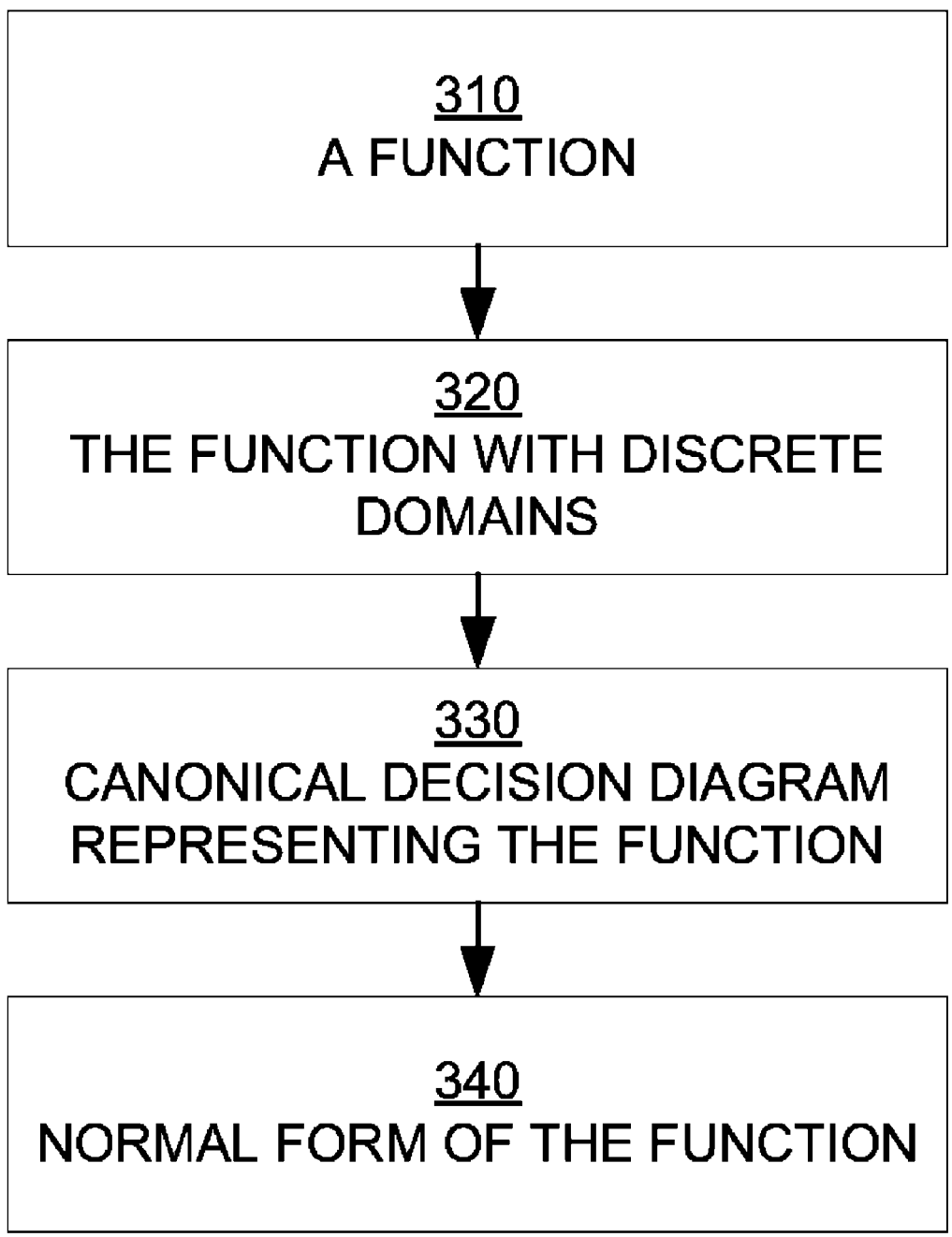
FIG. 3 is a block diagram illustrating the transformation of a function into a decision diagram according to one embodiment.

FIG. 3 provides an overview of the various stages in the transformation of a function according to one embodiment. In general, the satisfiability solver API 250 decomposes a function 310 of 'n' arguments (variables) into a canonical decision diagram structure 330 such as a directed acyclic graph (DAG). If the decision diagram 330 resolves only to a false sink node, then no assignment of the variables can succeed. If the decision diagram resolves only to a true sink node, then all variable assignments are successful. If the decision diagram resolves to both a false sink node and a true sink node, then some variable assignments (the assignments that lead to the true sink) are successful.

Figure 5:
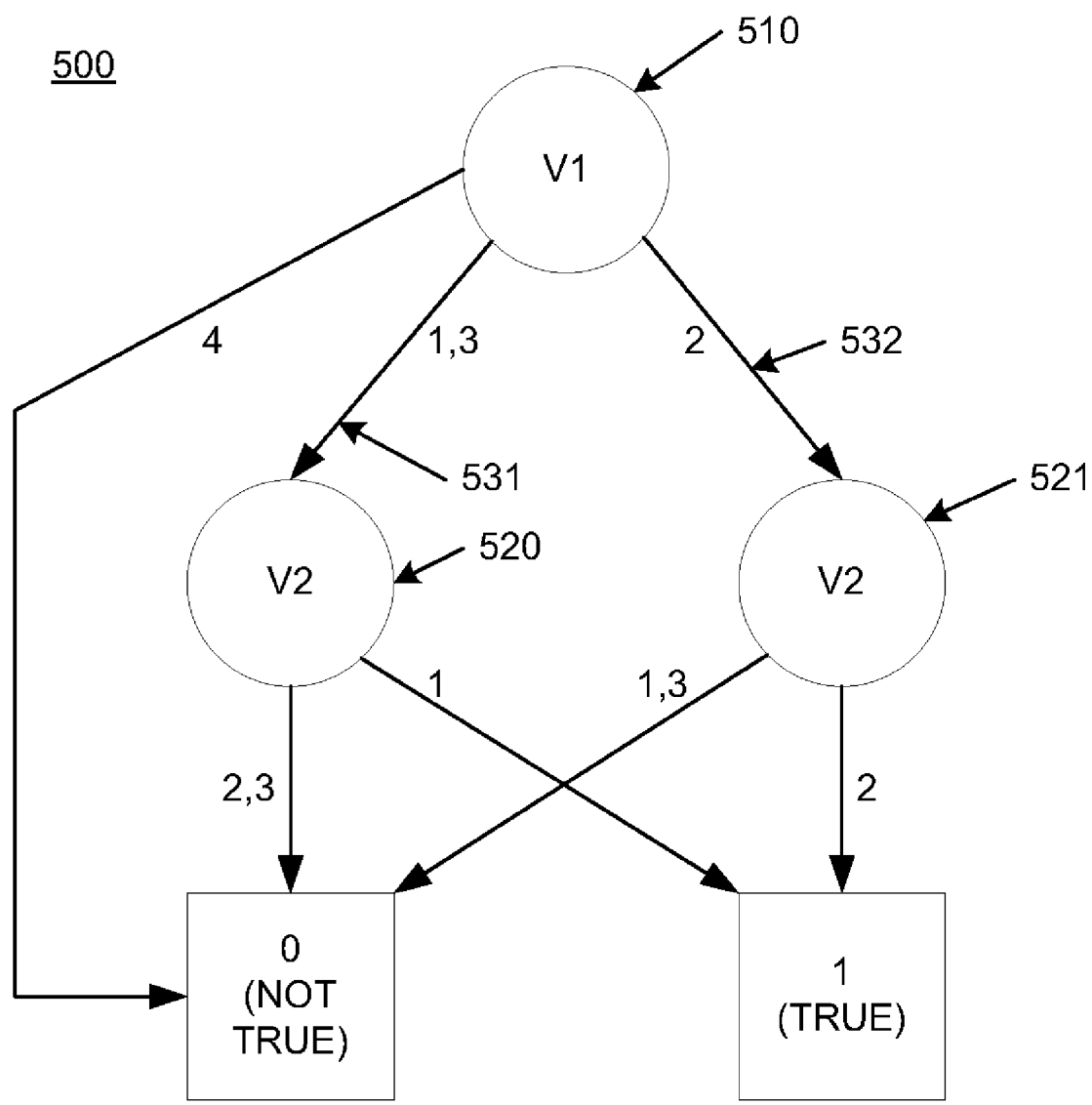
FIG. 5 illustrates an example of a decision diagram structure according to one embodiment.

An example of a decision diagram is shown in FIG. 5, which is described further below. Continuing with reference to FIG. 3, the decision diagram 330 is canonical in the sense that all functionally equivalent definitions are represented in the same manner. More specifically, in one embodiment, the decision diagram 330 has the following properties:

Each of its vertices represents a variable with the exception of two sink nodes (the false and true nodes). In the examples herein, the false node is assigned a value of binary zero (0) and the true node is assigned a value of binary one (1).

Each outgoing edge for a particular vertex is labeled with a member of that vertex's domain (the domain of the variable associated with that vertex)—a vertex has an outgoing edge for each member of the vertex's domain.

Each vertex is a function evaluated by choosing outgoing edges based on the assignment of the variable corresponding to the vertex.

The variable identifier for the source of an outgoing edge is less than the variable identifier for the edge's target. In other words, the decision diagram 330 is ordered. The target may be one of the sink nodes. The order of the variables within the decision diagram 330 is arbitrary, although it is recognized that performance is sensitive to the choice of variable order. The ordering is consistently applied so that the decision diagram 330 is well-formed.

The source of an outgoing edge cannot be a sink.

The decision diagram 330 cannot contain two vertices that represent logically equivalent functions.

A vertex may not exist where each outgoing edge targets the same vertex.

Generally speaking, in contrast to conventional decision diagrams in which variables have only a binary domain, the satisfiability solver described herein improves efficiency by representing functions as decision diagrams in which variables have arbitrarily sized domains. As a simplification, domain constraints that are always true can be set to 1 while domain constraints that are always false can be set to 0, in which case variables with domains of size 0 or 1 are disqualified from consideration.

As noted above, the decision diagram 330 is ordered. Vertices in the decision diagram have the following structure:

```
Vertex
{
    ' variable identifier
    int Variable;
    ' vertices representing an outcome for each possible variable
        assignment
    'note: children are ordinally aligned with members of the
        variable domain
    Vertex[ ] Children;
}
```

The function's variables may have a continuous domain. If so, then before the function 310 is decomposed into a decision diagram 330, the function 310 is first mapped to a different representation 320 in which the function is represented using Boolean expressions of variables that have discrete (finite) domains $D_i=\{1, 2, \ldots, f_i\}$. More specifically, a relational expression of the form "variable equal to/not equal to/less than/greater than/less than or equal to/greater than or equal to a constant" can be mapped to a discrete domain by examining all of the constants used with respect to a variable, and then decomposing the continuous domain into a series of discrete domains linked by Boolean expressions.

For example, given the following function:

$$X \geq 10 \text{ OR } (X=5 \text{ AND } X<7),$$

the variable X can be replaced with a new variable X' with the following discrete values:

X' in {<5, 5, between 5 and 7, 7, between 7 and 10, 10, >10}.

The function can then be rewritten as:

| | |
|---|---|
| X' in {10, > 10}OR | (X ≧ 10) |
| ( | |
|     X' in {5} AND | (X = 5) |
|     X' in {< 5, between 5 and 7} | (X < 7) |
| ) | |

In one embodiment, a normal form 340 (e.g., a disjunctive normal form and/or a conjunctive normal form) of the function 310 can be derived from the decision diagram 330. This is discussed further below, in conjunction with FIG. 5.

Figure 4:
FIG. 4 is a flowchart of one embodiment of a computer-implemented method for determining satisfiability of a function.
Figure 4:
Figure 4:

FIG. 4 is a flowchart 400 of one embodiment of a computer-implemented method for determining satisfiability of a function. Although specific steps are disclosed in the flowchart 400, such steps are exemplary. That is, various other steps or variations of the steps recited in the flowchart 400 can be performed. The steps in the flowchart 400 may be performed in an order different than presented. Furthermore, the features of the various embodiments described by the flowchart 400 can be used alone or in combination with each other. In one embodiment, the flowchart 400 can be implemented as computer-executable instructions stored in a computer-readable medium.

In block 410, a function to be evaluated is accessed from memory. The function includes some number of arguments (variables), some or all of which may have a continuous domain.

In block 420, if the function includes variables with a continuous domain, then the function is represented in a different form (function 320 of FIG. 3) in which the variables have discrete domains, as previously described herein.

In block 430 of FIG. 4, the function 320 is transformed by mapping each of its expressions to a respective if-then-else statement. A mapping of expression to if-then-else form is shown in Table 1.

TABLE 1

Example Mapping of Expressions

| Expression | If-Then-Else Form |
|---|---|
| x (term) | x-1-0 |
| x AND y | x-y-0 |
| x OR y | x-1-y |
| NOT x | x-0-1 |

Thus, for example, the expression "x AND y" is transformed into "if x, then y, else 0."

In block 440, each if-then-else statement is transformed into a vertex of the decision diagram 330 (FIG. 3). In one embodiment, the following recursive function is used to affect the transformation from if-then-else form to vertex:

```
IfThenElse(vertex i, vertex t, vertex e) returns Vertex:
' terminal
if i = 0
    return e
if i = 1
    return t
if t = 1 and e = 0
    return i
' determine top variable from inputs (which roots the return expression)
top ← min(i.Variable, t.Variable, e.Variable)
' compute children for new Vertex
Children[ ] ← Vertex[top domain size]
for each value in top domain
    Children[value] ← IfThenElse(
        EvaluateFor(i, top, value),
        EvaluateFor(t, top, value),
        EvaluateFor(e, top, value))
' if all children are identical, the value of top does not matter
if Children are identical
    return Children[1]
return CreateVertex { .Variable = top, .Children = children }
```

In the above, "EvaluateFor" evaluates a vertex for a particular value of the variable corresponding to that vertex. In essence, a vertex representing the function when the variable value is bound to the particular value is returned. "EvaluateFor" can be implemented as follows:

```
EvaluateFor(Vertex v, int variable, int value) returns Vertex:
if v.Variable > variable
    ' by order invariant, variable cannot influence v
    return v
' know that v.Variable must equal variable because top ≦ v.Variable
return v.Children[value]
```

In the implementation just described, one child is generated for each member of the variable domain, in contrast to conventional implementations that generate a fixed pair of children. Each vertex can be viewed as defining the Shannon decomposition of the function at the vertex on the vertex's variable.

In the implementation above, "IfThenElse" will return a vertex that evaluates to true if and only if the given if-then-else statement evaluates to true, and that the ordering invariant is preserved. With a canonical vertex representation, a single instance of any function will exist by remembering all vertices and returning an existing equivalent vertex where one exists according to "CreateVertex."

As previously noted herein, the resulting decision diagram is used to evaluate the function to determine whether the function is valid, satisfiable or unsatisfiable for given values of the variables. To determine validity/satisfiability/unsatisfiability, the decision diagram generated in block 440 is merely examined. All unsatisfiable functions resolve to 0 and all valid functions resolve to 1; otherwise, the function is satisfiable but not valid.

FIG. 5 illustrates an example of a decision diagram structure 500 according to one embodiment. The decision diagram structure 500 represents the following function of two variables:

$$f(v1,v2)=(v1 \text{ in } \{1,3\} \text{ and } v2 \text{ in } \{1\}) \text{ or } (v1 \text{ in } \{2\} \text{ and } v2 \text{ in } \{2\}),$$

where v1 has domain $\{1,2,3,4\}$ and v2 has domain $\{1,2,3\}$.

The structure 500 is generated as described above and satisfies each of the properties presented above in conjunction with FIG. 3. In the example of FIG. 5, the vertex 510 corresponds to the variable v1, and the vertices 520 and 521 correspond to the variable v2. Looking at vertex 510, for instance, the outgoing edge 531 is associated with v1 in the domain $\{1,3\}$, and the outgoing edge 532 is associated with v2 in the domain $\{2\}$. The edge 531 can be alternatively represented as two edges, one for the domain $\{1\}$ and one for the domain $\{3\}$. The structure 500 can be used to evaluate the function $f(v1, v2)$ to determine whether the function is satisfiable or unsatisfiable for given values of the variables. In the example of FIG. 5, the function is satisfiable for the following variable assignment: v1 in $\{1,3\}$, v2 in $\{1\}$; and v1 in $\{2\}$, v2 in $\{2\}$.

The normal form of the function can be derived from the decision diagram derived in block 440 of FIG. 4. A disjunctive normal form can be read directly from the decision diagram, where every clause corresponds to a path from the root to the true node. In other words, every variable combination that results in the function being satisfied is a clause in the disjunctive normal form. The example of FIG. 5 can be used to demonstrate the derivation of the disjunction normal form. As already mentioned, the following paths lead to the true node: v1 in $\{1,3\}$, v2 in $\{1\}$; and v1 in $\{2\}$, v2 in $\{2\}$. The disjunctive normal form is therefore (v1 in $\{1,3\}$ AND v2 in $\{1\}$) OR (v1 in $\{2\}$ AND v2 in $\{2\}$).

The conjunctive normal form can be readily derived as well by considering the disjunctive normal form of the negation of the function, or the set of all paths that lead to the false node: v1 in $\{1,3\}$, v2 in $\{2,3\}$; v1 in $\{2\}$, v2 in $\{1,3\}$; and v1 in $\{4\}$, resulting in (v1 in $\{1,3\}$ AND v2 in $\{2,3\}$) OR (v1 in $\{2\}$ AND v2 in $\{1,3\}$) OR (v1 in $\{4\}$). Taking the negation of the negated function, and pushing down the "not" yields the conjunctive normal form (the literals are the same, but the constraint ranges are inverted): (v1 in $\{2,4\}$ OR v2 in $\{1,4\}$) AND (v1 in $\{1,3,4\}$ OR v2 in $\{2\}$) AND (v1 in $\{1,2,3\}$).

In summary, for a class of functions taking 'n' arguments and returning either true or false, the satisfiability solver described herein can efficiently determine whether any assignment to those variables will return true. In particular, the satisfiability solver can handle functions that can be represented in the following grammar:
Function: Relation Boolean;
Relation:
    Variable=Constant|Variable>Constant|Variable≧
    Constant|Variable<Constant|Variable≦
    Constant|Variable≠Constant;
Boolean: NOT(Function)|AND(Function,Function)|OR(Function,Function);
Constant;
Variable.

By virtue of this concise grammar, fairly involved queries can be answered—for instance, whether given facts imply some statement. Given a knowledge base, a determination can be made whether a query is always true (entailment). One practical use of the satisfiability solver described herein is in the ADO.NET Entity Framework by Microsoft™, in particular to validate relational database-to-object mappings.

In the foregoing specification, embodiments have been described with reference to numerous specific details that may vary from implementation to implementation. Thus, the sole and exclusive indicator of what is the invention, and is intended by the applicant to be the invention, is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A computer-implemented method for determining satisfiability of a function, said method comprising:
    accessing a function comprising a plurality of variables; and
    representing said function as a canonical decision diagram structure having a plurality of vertices and a plurality of sink nodes, each of said vertices associated with a respective variable of said function, wherein said vertices include a vertex that represents a domain of more than two values for a variable associated with said vertex;
    wherein said function is satisfiable for values of said variables that resolve to true within said decision diagram structure and is unsatisfiable for values of said variables that resolve to false within said decision diagram structure.

2. The method of claim 1 wherein said decision diagram structure is a directed acyclic graph (DAG).

3. The method of claim 1 wherein said function is represented in a form in which each of said variables has a finite domain.

4. The method of claim 1 wherein said function is represented using Boolean expressions of said variables before said function is transformed into said decision diagram structure.

5. The method of claim 4 further comprising:
   mapping said Boolean expressions to respective if-then-else forms; and
   transforming said if-then-else forms into said vertices.

6. The method of claim 1 further comprising evaluating said vertices for given values of said variables.

7. The method of claim 1 wherein said decision diagram structure is used to derive a normal form of said function, wherein said normal form is a conjunctive normal form or a disjunctive normal form.

8. A computer-readable medium having computer-executable components comprising:
   a function comprising a plurality of variables; and
   a canonical decision diagram structure representing said function and having a plurality of vertices, each of said vertices associated with a respective variable of said function, wherein said vertices include a vertex that represents a domain of more than two values for a variable associated with said vertex, and wherein said decision diagram structure is useful for determining satisfiability of said function.

9. The computer-readable medium of claim 8 wherein said function is satisfiable for values of said variables that resolve to a first sink node of said decision diagram structure and is unsatisfiable for values of said variables that resolve to a second sink node of said decision diagram structure.

10. The computer-readable medium of claim 8 wherein said decision diagram structure is a directed acyclic graph (DAG).

11. The computer-readable medium of claim 8 wherein said function is represented in a form in which each of said variables has a finite domain.

12. The computer-readable medium of claim 8 wherein said function is represented using Boolean expressions of said variables before said function is transformed into said decision diagram structure.

13. The computer-readable medium of claim 12 wherein said computer-executable components further comprise a table that maps Boolean expressions to respective if-then-else forms, wherein said if-then-else forms are transformed into said vertices.

14. The computer-readable medium of claim 8 wherein said computer-executable components further comprise a normal form of said function derived from said decision diagram structure, wherein said normal form is a conjunctive normal form or a disjunctive normal form.

15. A computer system comprising:
   a central processing unit (CPU); and
   a computer-readable medium having computer-readable instructions stored therein that are executable by said CPU, said instructions being executable to represent a function as a directed acyclic graph (DAG) having a plurality of vertices and a plurality of sink nodes, each of said vertices associated with a respective variable of said function, wherein said vertices include a vertex that represents a domain of more than two values for a variable associated with said vertex; said instructions also executable to evaluate said function variables using said DAG, wherein said function is satisfiable for values of variables that evaluate to true using said DAG and is unsatisfiable for values of variables that evaluate to false using said DAG.

16. The computer system of claim 15 wherein said function is represented in a form in which each variable has a finite domain.

17. The computer system of claim 15 wherein said function is represented using Boolean expressions of said variables before said function is transformed into said DAG.

18. The computer system of claim 17 wherein said instructions are also executable to map said Boolean expressions to respective if-then-else forms and to transform said if-then-else forms into said vertices.

19. The computer system of claim 15 wherein said instructions are also executable to evaluate said vertices for given values of said variables.

20. The computer system of claim 15 wherein said decision diagram structure is used to derive a normal form of said function, wherein said normal form is a conjunctive normal form or a disjunctive normal form.

* * * * *